United States Patent
Fetisov et al.

(10) Patent No.: US 10,048,152 B2
(45) Date of Patent: Aug. 14, 2018

(54) PRESSURE TRANSMITTER WITH OVERPRESSURE PROTECTION

(71) Applicant: Rosemount Inc., Chanhassen, MN (US)

(72) Inventors: Aleksandr Valdimirovich Fetisov, Chelyabinsk (RU); Pavel Aleksandrovich Petukhov, Chelyabinsk (RU); Galina Vladimirovna Cherkashina, Chelyabinsk (RU); Charles R. Willcox, Chanhassen, MN (US)

(73) Assignee: Rosemount Inc., Shakopee, MN (US)

( * ) Notice: Subject to any disclaimer, the term of this patent is extended or adjusted under 35 U.S.C. 154(b) by 144 days.

(21) Appl. No.: 15/148,316

(22) Filed: May 6, 2016

(65) Prior Publication Data

US 2017/0089793 A1    Mar. 30, 2017

Related U.S. Application Data (63) Continuation of application No. PCT/RU2015/000632, filed on Sep. 30, 2015.

(51) Int. Cl.
*G01L 7/00* (2006.01)
*G01L 19/06* (2006.01)
(Continued)

(52) U.S. Cl.
CPC ........ *G01L 19/0618* (2013.01); *G01L 9/0064* (2013.01); *G01L 9/0072* (2013.01); *G01L 19/0046* (2013.01); *G01L 19/06* (2013.01)

(58) Field of Classification Search
None
See application file for complete search history.

(56) References Cited

U.S. PATENT DOCUMENTS

| 4,612,812 A | 9/1986 | Broden |
| 5,731,522 A * | 3/1998 | Sittler ..................... G01L 19/04 |
| | | 73/706 |

(Continued)

FOREIGN PATENT DOCUMENTS

JP    2001074582    3/2001

OTHER PUBLICATIONS

Lavreshin P. I. et al. Datchiki davleniya. Chast I. Uliyanovsky gosudarstvenny teknichesky universitet. Kafedra "IBK". Uliyanovsk, 2012, p. 16, lines 16-24, p. 37-40. 9 Pages, Partial Machine Translation and Original.

(Continued)

*Primary Examiner* — Andre Allen
(74) *Attorney, Agent, or Firm* — Christopher R. Christenson; Kelly, Holt & Christenson, PLLC (57) ABSTRACT

A process fluid pressure transmitter is provided. The process fluid pressure transmitter includes a pressure sensor having an electrical characteristic that changes in response to a deformation of the pressure sensor in response to pressure. Measurement circuitry is coupled to the pressure sensor and is configured to provide an indication of the electrical characteristic. An isolation diaphragm is configured to contact the process fluid and deform in response to process fluid pressure. A substantially incompressible fill fluid fluidically couples the isolation diaphragm to the pressure sensor. An overpressure compliant structure is coupled to the fill fluid and is configured to be substantially rigid at pressures below a selected threshold, but to deform in response to pressure above the selected threshold.

19 Claims, 13 Drawing Sheets

(51) Int. Cl.
*G01L 9/00* (2006.01)
*G01L 19/00* (2006.01)

(56) References Cited

U.S. PATENT DOCUMENTS

| | | |
|---|---|---|
| 8,511,151 B2 | 8/2013 | Becher et al. |
| 9,816,889 B2 * | 11/2017 | Grimes ............... G01L 19/0618 |
| 2009/0078054 A1 * | 3/2009 | Romo ..................... G01L 19/04 |
| | | 73/717 |
| 2011/0303023 A1 | 12/2011 | Becher et al. |
| 2011/0320142 A1 | 12/2011 | Surman et al. |
| 2016/0223420 A1 * | 8/2016 | Grimes ................ G01L 13/025 |

OTHER PUBLICATIONS

International Search Report and Opinion for PCT/RU 2015/000632, dated Jun. 23, 2016, Filed Sep. 30, 2015, 8 pages.

* cited by examiner

PRESSURE TRANSMITTER WITH OVERPRESSURE PROTECTION

CROSS-REFERENCE TO RELATED APPLICATION

This Application is a continuation application filed under 35 U.S.C. 111(a) and claims benefit of International Application No. PCT/RU2015/000632, filed Sep. 30. 2015, the contents of which are hereby incorporated by reference in their entirety.

BACKGROUND

Industrial process control systems are used to monitor and control industrial processes which produce or transfer materials, such as process fluids. In such systems, it is typically important to measure "process variables" such as temperature, pressure, flow rate, and others. Process control transmitters are used to measure such process variables and transmit information related to the measured process variable back to a central location such as a central control room.

One type of process variable transmitter is a pressure transmitter that measures one or more pressures (such as gauge or absolute pressure) of a process fluid and provides an output related to the measured pressure. The pressure transmitter is configured to transmit the pressure information back to the control room or other suitable device, typically via a wired process communication loop. However, other techniques, such as wireless communication techniques may be used instead or as well.

Process pressure transmitters generally sense pressure using a pressure sensor that is fluidically coupled to an isolation diaphragm. The isolation diaphragm isolates the pressure sensor from process fluids that are being sensed. Process fluids, which can be highly corrosive and/or at high temperatures, are thus kept isolated from the pressure sensor in order to avoid corrosion or damage to the pressure sensor. Pressure is transferred from the isolation diaphragm to the pressure sensor using a substantially incompressible, inert fill fluid, such as silicone oil. The pressure sensor itself has a physical structure such as a sensing diaphragm that reacts to the pressure, such as by deforming. The pressure sensor also includes an electrical structure, such as a strain gage or capacitive plate or electrode that reacts to the physical deformation. For example, some known pressure sensors have a deflectable diaphragm that bears a capacitive plate or electrode such that deflection of the diaphragm produces a change in the sensor's capacitance. Still other pressure sensors employ a resistive strain gage structure that is disposed on a brittle deformable silicon substrate. As the silicon substrate deforms in response to the pressure, the resistance of the strain gage changes.

One of the limitations of existing pressure transmitters is their potential susceptibility to high over pressures. Since, isolator-based pressure transmitters use a substantially incompressible fluid to couple the pressure sensing element to the process fluid or gas, the fill fluid transmits high pressures to the sensing element during an overpressure event. This can result in sensor failure. Moreover, even in situations where the overpressure does not immediately cause sensor failure, repeated excursion to relatively high overpressures can degrade the pressure sensor over time and affect its performance.

SUMMARY

A process fluid pressure transmitter is provided. The process fluid pressure transmitter includes a pressure sensor having an electrical characteristic that changes in response to a deformation of the pressure sensor in response to pressure. Measurement circuitry is coupled to the pressure sensor and is configured to provide an indication of the electrical characteristic. An isolation diaphragm is configured to contact the process fluid and deform in response to process fluid pressure. A substantially incompressible fill fluid fluidically couples the isolation diaphragm to the pressure sensor. An overpressure compliant structure is coupled to the fill fluid and is configured to be substantially rigid at low pressures, but able to deform sufficiently at high pressures to enable the isolating diaphragm to seat itself, or "bottom out", thereby preventing further pressure from reaching the pressure sensor.

DETAILED DESCRIPTION

Figure 1:
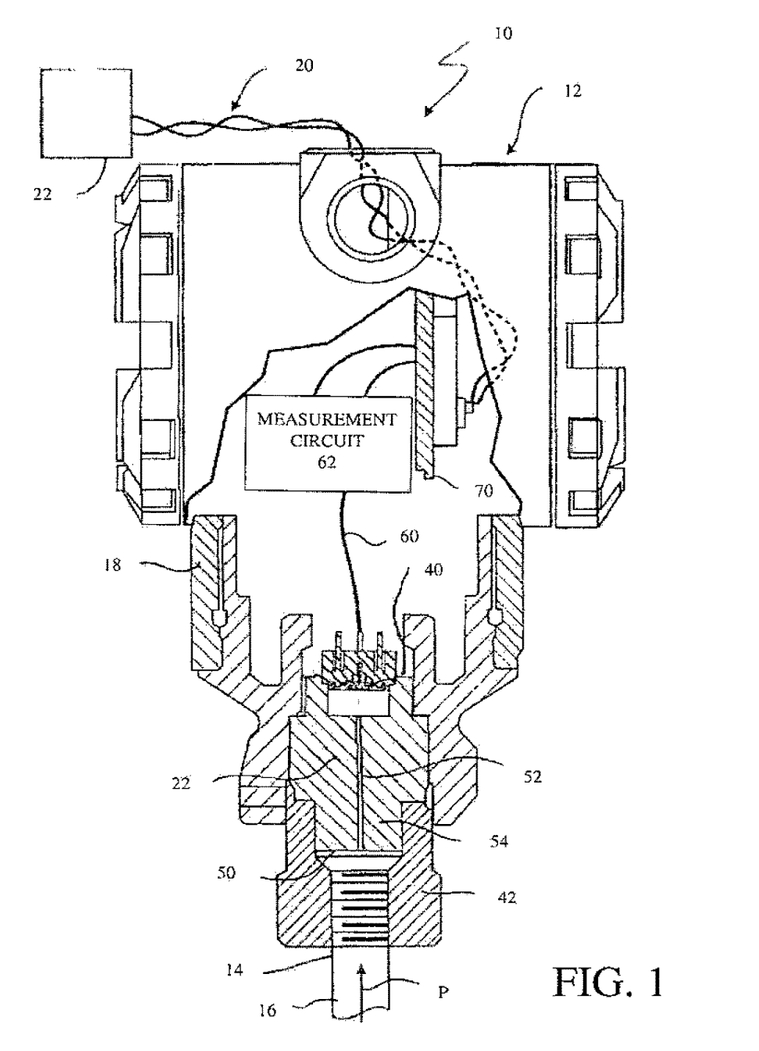
FIG. 1 shows an exemplary process fluid pressure transmitter with which embodiments of the present invention are particularly useful.

FIG. 1 shows an exemplary process fluid pressure transmitter 12 with which embodiments of the present invention are particularly useful. Process control or measurement system 10 includes a pressure transmitter 12 coupled to process piping 14 which carries a process fluid 16. Process fluid 16 applies a pressure P to the pressure transmitter 12. Pressure transmitter 12 provides an output, for example on a two-wire process control loop 20 to a remote location such as a control room 22. The process control loop 20 can operate in accordance with any appropriate process communication protocol. In one configuration, process control loop 20 comprises a two-wire process control loop in which an analog current level is used to represent a "process variable" related to the process pressure P. In another example implementation, the process control loop 20 carries a digital value which is related to the process pressure P. Examples of such protocols include the Highway Addressable Remote Transducer (HART®) or FOUNDATION™ Fieldbus communication protocols. Another example process control loop comprises a wireless communication link, such as that in accordance with IEC62591. In such a configuration, element 20 represents a wireless communication link between transmitter 12 and process control room 22.

Transmitter 12 includes a pressure sensor (in this example a pressure sensor die) 40 which can operate in accordance with any appropriate technique. Example techniques include micro machined configurations, for example, which have an element with an electrical property that changes in response to applied pressure. Process coupling 42 couples a body or housing 18 of transmitter 12 to process piping 14. This allows process pressure P to be applied to isolation diaphragm 50 of transmitter 12. The pressure P causes a deflection in the diaphragm 50 which is transmitted through a fill fluid, such as silicone oil, in passageway 52 to pressure sensor 40. Thus, isolation diaphragm 50 has a first side that contacts the process fluid and an opposite side that contacts the fill fluid. Passageway 52 extends through pressure sensor module 54 which also supports pressure sensor 40. Pressure sensor 40 provides an electrical output 60 to measurement circuitry 62. Measurement circuitry 62 connects to a terminal block 70 which couples to process control loop 20. In one example configuration, process control loop 20 is also used to provide power to circuitry, such as measurement circuitry 62, of transmitter 12.

Figure 2:
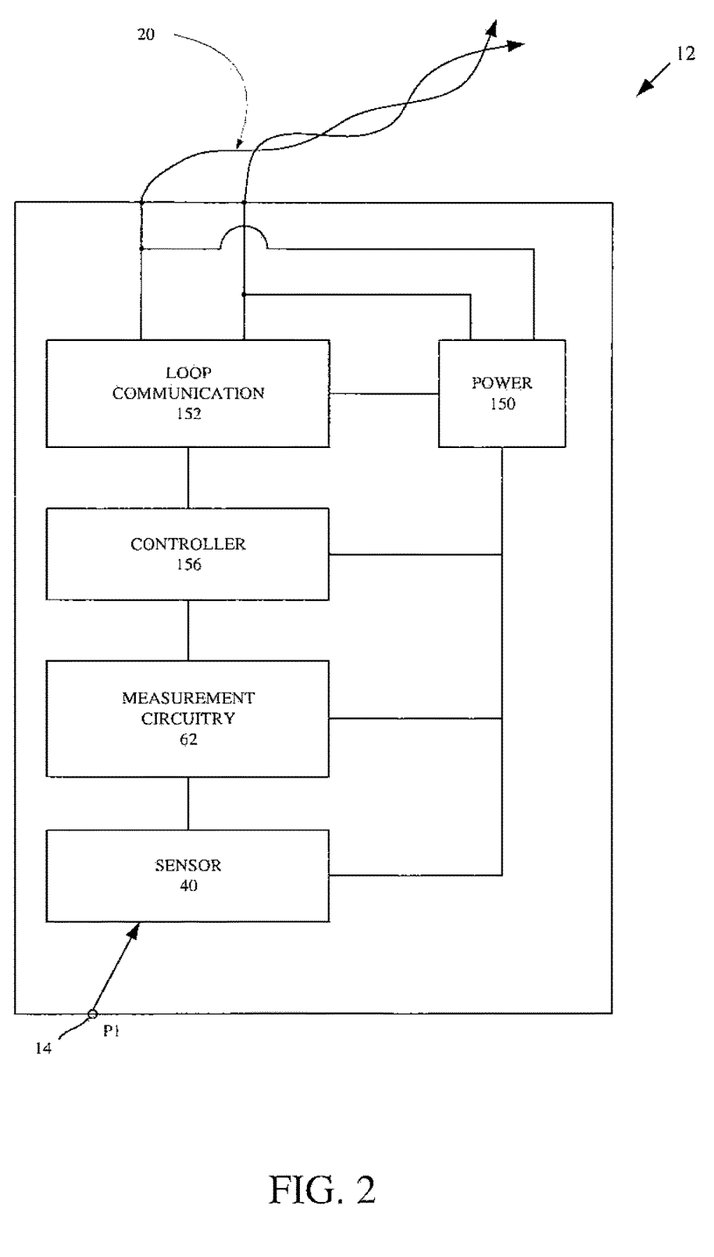
FIG. 2 is a block diagram of an exemplary pressure transmitter with which embodiments of the present invention are particularly useful.

FIG. 2 is a block diagram of pressure transmitter 12. Pressure transmitter 12 includes power module 150 and loop communicator 152, each of which are coupled to process communication loop 20. In one embodiment, power module 150 receives energy from loop 20 and provides electrical power to all components of pressure transmitter 12. Loop communicator 152 is coupled to controller 156 such that loop communicator 152 provides data to controller 156 indicative of process communication signals received from loop 20. Conversely, loop communicator 152 can receive data from controller 156 and generate suitable process communication signals on loop 20.

Loop communicator 152 can be any suitable device that is adapted to generate suitable signals on process communication loop 20 in accordance with a process communication industry standard protocol. Suitable examples of such process industry communication protocols include those set forth above. Additionally, transmitter 12, by virtue of cooperation between power module 150 and loop communication module 152, is able to communicate, at least in some embodiments, over the same communication media from which it receives power. Depending on the application, loop communicator 152 may be, or include, a wireless transceiver that is adapted to communicate in accordance with any suitable wireless communication protocol including that set forth above.

Controller 156 is any suitable device that is able to execute a series of programmatic instructions to provide a control or monitoring function. In one embodiment, controller 156 is a microprocessor. Controller 156 is coupled to measurement circuitry 62, which is coupled to sensor 40. Measurement circuitry 62 includes suitable circuitry to measure one or more varying electrical characteristic(s) of sensor 40 and provide data to controller 156 indicative of process fluid pressure. Preferably, measurement circuitry 62 includes at least one analog-to-digital converter adapted to convert capacitance or resistance of pressure sensor 40 to digital data that is transmitted to controller 156.

Figure 3:
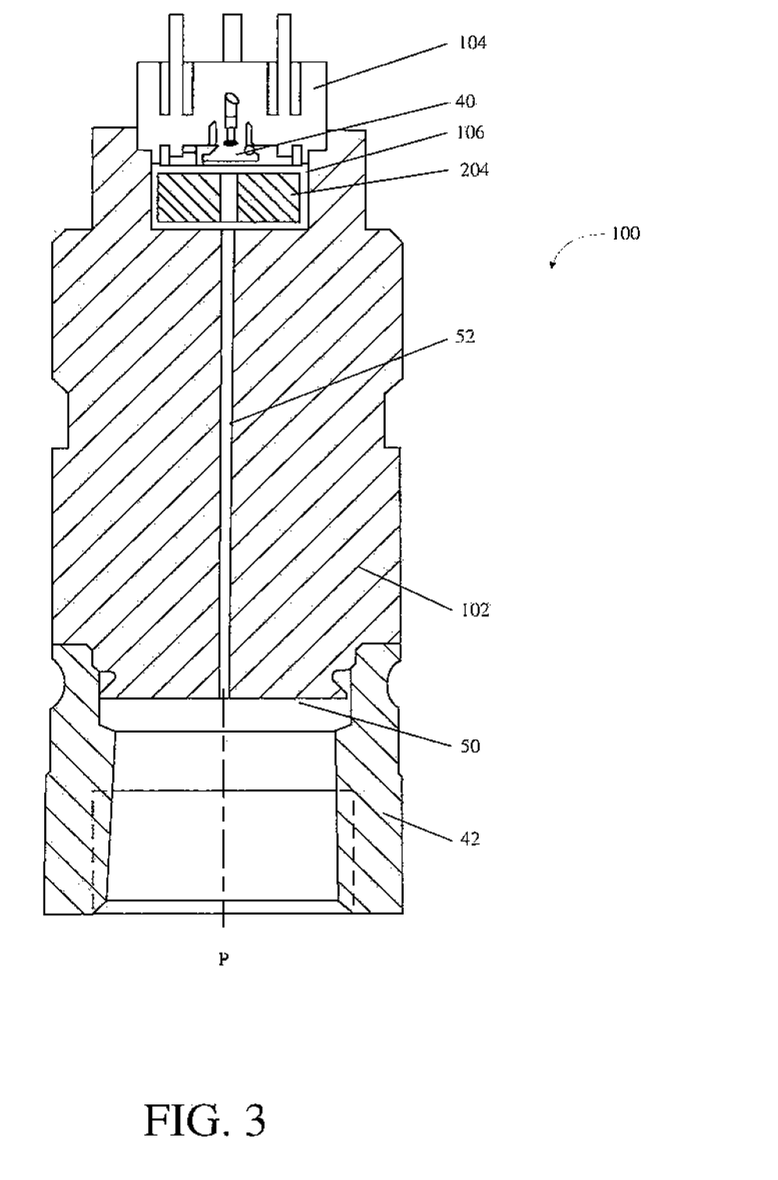
FIG. 3 is a diagrammatic view of a pressure sensor module in accordance with the prior art.

FIG. 3 is a diagrammatic view of a pressure sensor module 100 in accordance with the prior art. Pressure sensor module 100 generally includes a body 102 that is formed of a metal such as stainless steel with a fill fluid passageway 52 extending therethrough. Fill fluid passageway 52 is fluidically coupled to cavity 106 that may be filled with a substantially incompressible fill fluid, such as silicone oil. Additionally, in some environments, a ceramic disc 204 is provided within cavity 106. The ceramic disc has a coefficient of thermal expansion that is different from that of the fill fluid and metallic body 102. Ceramic disc 204 and its associated thermal expansion/contraction help offset changes in thermal expansion/contraction of body 102 and the fill fluid. In this way, ceramic disc 204 may be used to help compensate the pressure transmitter for temperature effects. Pressure sensor 40 is coupled to cavity 106 and deflects in response to pressure within cavity 106. Electrical contacts to pressure sensor 40 are made through header 104, which is mechanically attached to body 102. As shown in FIG. 3, pressure P is coupled to isolator diaphragm 50. Accordingly, pressure P acting on isolator diaphragm 50 generates movement of diaphragm 50 which conveys an associated pressure through the fill fluid in passageway 52 to cavity 106. In the arrangement shown in FIG. 3, when an overpressure condition occurs, sensor 40 can be damaged or destroyed due to pressure excesses that are transmitted through the fill fluid.

In accordance with one embodiment of the present invention, a relatively rigid or inflexible structure is provided that remains fixed when operating at pressures at or below a selected threshold, but which becomes flexible above the selected threshold. In one example, the selected threshold may be 25% above the maximum pressure for which measurements are desired. Thus, when the pressure transmitter is operating within its nominally designed range, the structure(s) is/are substantially rigid. Thus, deflections of the isolation diaphragm generate associated movement of fill fluid through passageway and generate associated pressure within a cavity that is coupled to the pressure sensor. However, in situations where the process fluid pressure exceeds the selected threshold, the otherwise rigid structure will conform or deflect such that the fill fluid does not convey what would otherwise be a damaging fluid displacement against the relatively delicate pressure sensor. Embodiments of the present invention will generally be described with respect to two distinct embodiments, each of which provides such an overpressure compliant structure. In one embodiment, the compliant structure is relatively fixed until a set pressure threshold is achieved and in another embodiment, the structure is continuously compliant, but small enough at low pressures to not affect the normal operation of the sensor. It is easy to see that alternative embodiments of the present invention can be practiced using other suitable structures, as well as any combination thereof.

Figure 4:
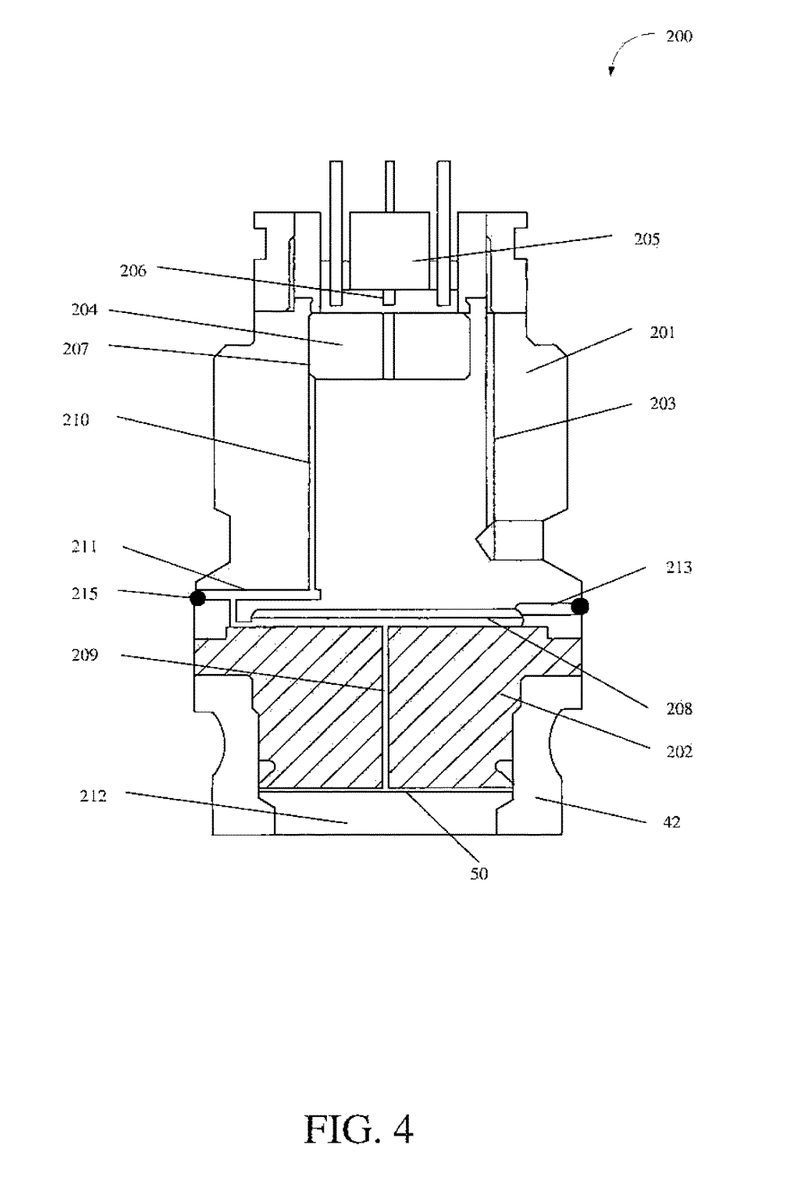
FIG. 4 is a cross-sectional view of a pressure sensor module in accordance with an embodiment of the present invention.

FIG. 4 is a cross-sectional view of a pressure sensor module in accordance with an embodiment of the present invention. Pressure sensor module 200 includes upper and lower portions 201, 202, respectively. Portions 201, 202 are welded together or otherwise suitably affixed to one another. In the embodiment shown in FIG.4, a rigid flexible diaphragm 208 is installed in the space between first portion 201 and second portion 202. While the term "rigid flexible diaphragm" may seem counterintuitive, it is, in fact, very descriptive of its function. Specifically, for pressures that are at or below a selected threshold (such as 1.2 times the upper range limit of the pressure transmitter) diaphragm 50 is substantially rigid. Accordingly, in such instances, flexure of isolation diaphragm 50 will generate movement of fill fluid through passageway 209 and into passageway 211 which is coupled to passageway 210 which ultimately is fluidically coupled to chamber 207 and pressure sensor 206. Thus, for pressures that are at or below the selected threshold, a certain amount of flexure of isolation diaphragm 50 will generate an associated movement of fill fluid through passageway 210 and thus be transduced or otherwise measured by pressure sensor 206.

However, when the process fluid pressure exceeds the selected threshold (such as 1.2 times the upper range limit of the pressure transmitter) rigid flexible diaphragm 208 will flex and thus create more available oil volume allowing the isolator to further displace without increasing pressure on the sensor. In this way, the amount of fill fluid flowing through passageway 210 will be relatively constant in comparison to the amount of fill fluid that flows in response to the movements of isolation diaphragm 50 when no overpressure is present. Hence, the pressure ultimately applied to pressure sensor 206 is limited and thus pressure sensor 206 is protected from the overpressure event. Accordingly, pressure sensor 206 will more easily withstand the overpressure event. At sufficiently high pressures (e.g. 2-3 times the upper range limit) isolator diaphragm 50 comes to a fixed stop (i.e. bottoms-out) against second portion 202, such that further pressure increases impact the inlet cavity only, i.e. the surface of isolator diaphragm 50 and the weld between the connector and the lower part of housing 202 thus eliminating the effect of high overpressure on sensor 206. This helps maintain sensor 206's availability and metrological characteristics as well as increases the uptime and reliability of the transmitter. As the overpressure event recedes, rigid flexible diaphragm 208 will return to its original position and thus the transmitter can continue providing pressure readings with suffering damage from the overpressure condition.

As shown in FIG. 4, a pair of fluid volumes are provided. A first fill fluid volume is provided proximate isolator diaphragm 50 through passageways 209, 211, 210 and ultimately filling cavity 207. The first fluid volume can be filled through channel 211, the end 215 of which can then be sealed. Note, in the embodiment shown in FIG. 4, cavity 207 is also substantially filled by ceramic disc 204, which may provide temperature compensating effects, as described above. A second fluid volume is disposed on an opposite side of rigid flexible diaphragm 208 from the first fill fluid volume. This second fill fluid is filled or otherwise provided through port 213 which is subsequently sealed or welded shut. The second fill fluid is contained within a second cavity on the opposite side of diaphragm 208 to allow the diaphragm to flex in a overpressure situation.

Figure 5:
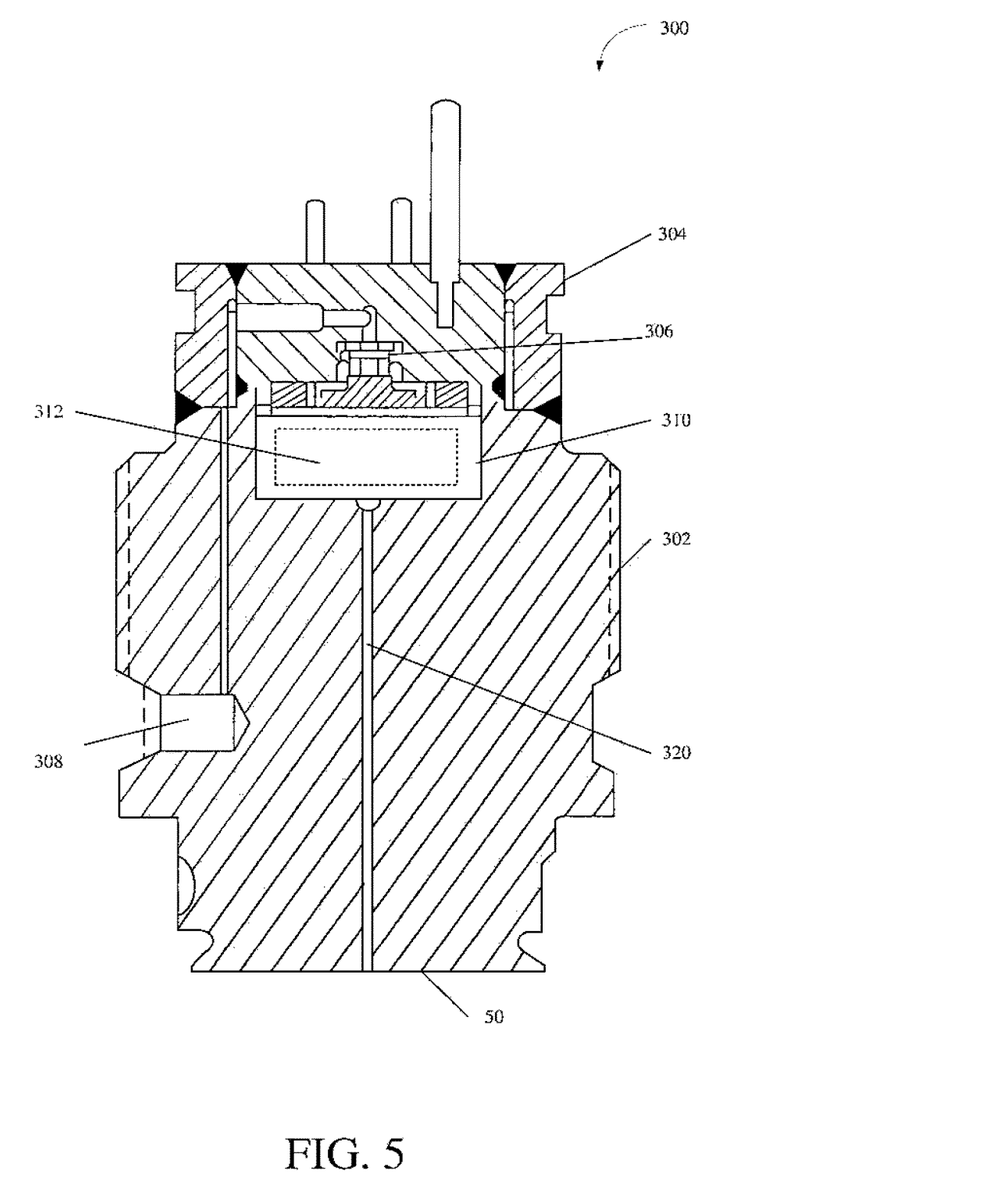
FIG. 5 is a diagrammatic cross-sectional view of a pressure sensor module having improved resiliency to overpressure events in accordance with an embodiment of the present invention.

FIG. 5 is a diagrammatic cross-sectional view of another embodiment showing a pressure sensor module having improved resiliency to overpressure events in accordance with another embodiment of the present invention. Module 300 includes body 302 coupled to header 304, which supports pressure sensor 306. In the embodiment illustrated in FIG. 5, pressure sensor module 300 provides a gauge pressure measurement in that the pressure acting upon isolation diaphragm 50 is referenced against atmospheric pressure supplied via vent 308. Unlike the embodiment illustrated with respect to FIG. 4, pressure sensor module 300 does not include a rigid flexible diaphragm. Instead, in chamber 310, hollow structure 312 is provided in place of a ceramic insert, such as insert 204 (shown in FIG. 4). Compliant insert 312 can be placed in suitable cavities of prior art pressure sensor modules thereby allowing such legacy devices to enjoy embodiments of the present invention. Additionally, or alternatively, compliant insert 312 can also be provided in chamber 207 of the embodiment shown in FIG. 4 in order to provide further overpressure compliance resiliency. Since compliant insert 312 replaces the prior art ceramic disc 204, it is important, in some embodiments, that compliant insert 312 have the same or similar thermal expansion characteristics as the ceramic insert that it is replacing. Suitable examples of metals that meet such requirements include iron-nickel alloys, such as NiSpan-C Alloy 902, available from Ulbrich Stainless Steels and Special Metals, Inc. of New Haven Conn. Additionally, while some embodiments of the present invention provide compliant insert 312 as a hollow metal can, embodiments can be practiced where a suitably compliant solid structure is used as long as the structure has sufficient compressibility. In fact, embodiments can be practiced where compliant insert 312 is formed of a non-metallic material, such as a polymer or a foam ceramic.

Compliant insert 312 is able to elastically deform in response to pressure with a limited deformation at normal operating pressures. Based on the material selection, wall thickness, and internal pressure, compliant insert 312 will deform sufficiently at a high pressure in order to increase the available volume for the fill fluid thereby allowing the isolator diaphragm 50 to bottom out against body 302. Once bottomed out, further increases in pressure will not be able to create additional fill fluid compression, thereby preventing excessive pressure from reaching the more fragile pressure sensor 306. The increase in effective fill fluid volume due to the deformation of compliant insert 312 with pressure is sufficient to allow isolator diaphragm 50 to bottom out at a pressure that is below the maximum rating of the pressure sensor 306. However, the increase in effective fill fluid volume due to compliant insert deformation should not be so large as to bottom out isolator diaphragm at the lowest temperature and maximum working pressure of sensor 306. Further still, the maximum stresses within compliant insert 312 should be kept below the yield levels of the material from which compliant insert 312 is formed at maximum pressure causing the isolator to bottom out. In this way, compliant insert 312 will not sustain plastic deformation in response to the overpressure event, but will instead return to its original shape and volume once the overpressure event is removed.

Figure 6A:
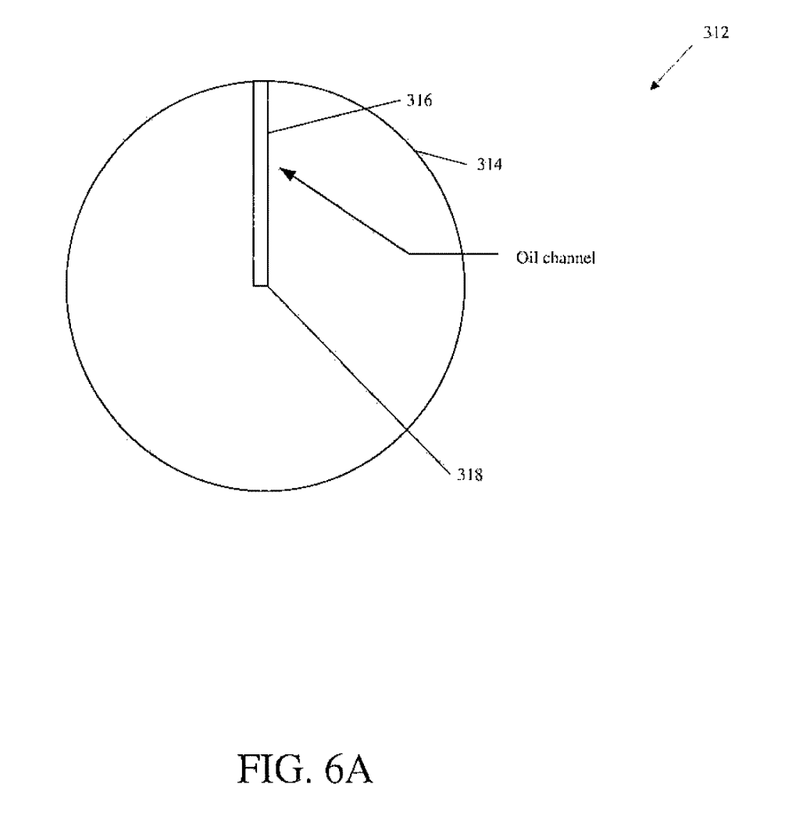
FIGS. 6A and 6B are diagrammatic top plan and side elevation views, respectively, of an external portion of a compliant insert showing fill fluid routing channels in accordance with an embodiment of the present invention.
Figure 6B:
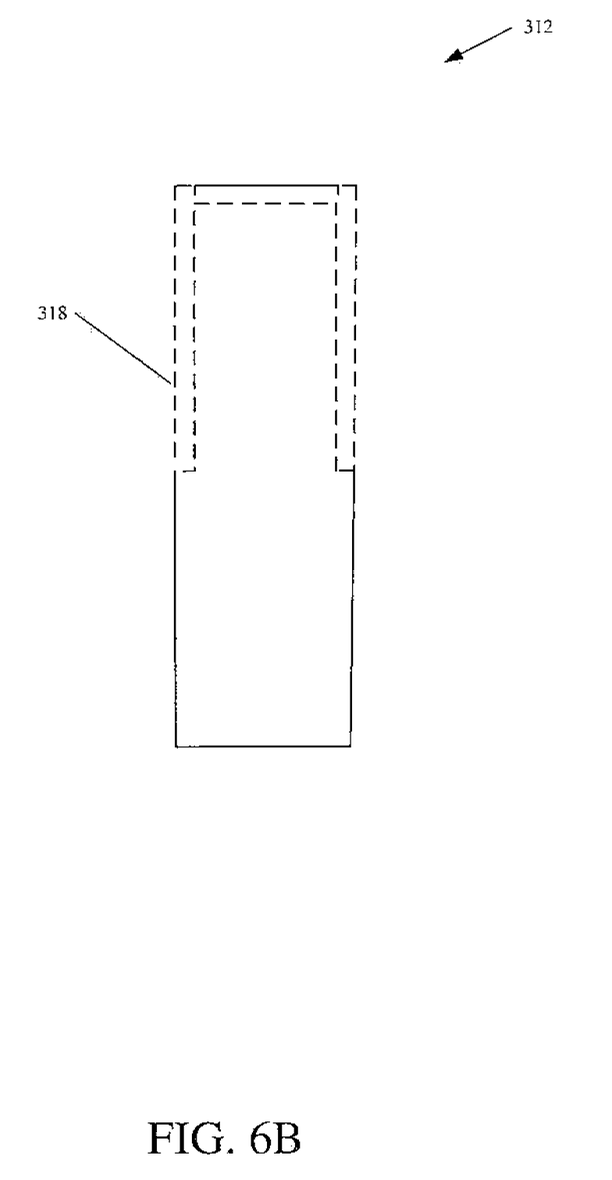

FIGS. 6A and 6B are diagrammatic top plan and side elevation views, respectively, of an external portion of compliant insert 312 in accordance with an embodiment of the present invention. As illustrated, compliant insert 312 generally has a circular outer diameter 314 and an oil channel 316 extending between center 318 and outer diameter 314. Oil channel 316, as shown in FIG. 5B, generally does not pass through compliant insert 312, but instead travels around an external surface thereof. Oil channel 312 is useful because compliant insert 312 may be sized to substantially fill cavity 310. When this occurs, oil channel 318 provides a pathway from fill fluid passageway 320 to a portion of cavity 310 proximate pressure sensor 306.

Figure 7A:
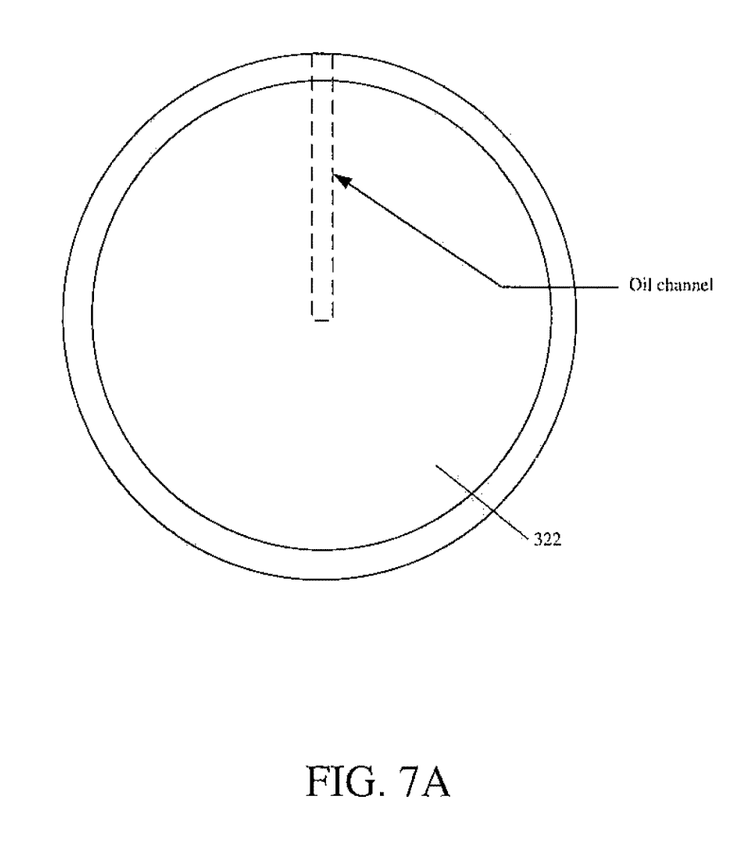
FIGS. 7A and 7B are top plan and side elevation views, respectively, of an internal view of a compliant insert with fill fluid routing channels in accordance with an embodiment of the present invention.
Figure 7B:
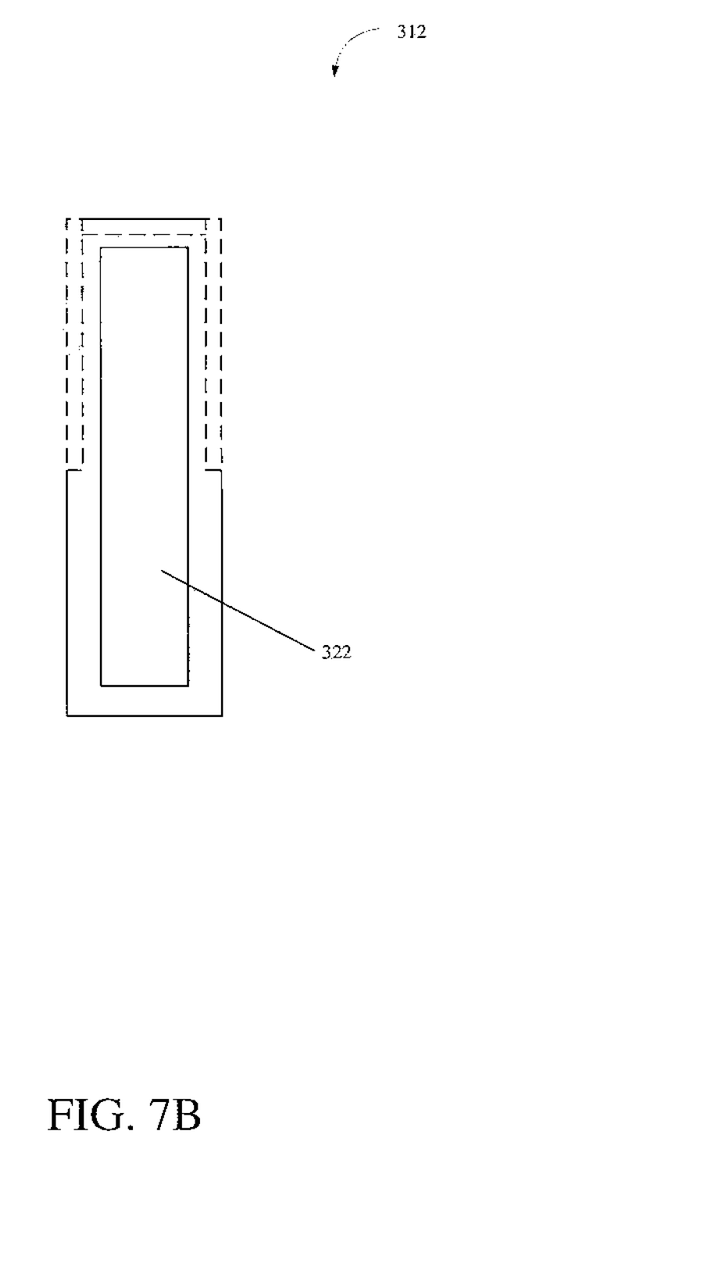

FIGS. 7A and 7B are top plan and side elevation views, respectively, of an internal view of compliant insert 312. The primary difference between FIGS. 7A, 7B and FIGS. 6A, 6B is the depiction of internal volume 322. This internal volume 322 is sealed. Thus, compliant insert 312 is generally manufactured having a specified internal pressure. However, this specified internal pressure can be a vacuum or suitably low pressure, as desired. The wall thickness of compliant insert 312 along with material selection and the differential pressure between the internal pressure of compliant insert 312 and the applied external pressure will cause a selectable amount of deformation of compliant insert 312.

Figure 8A:
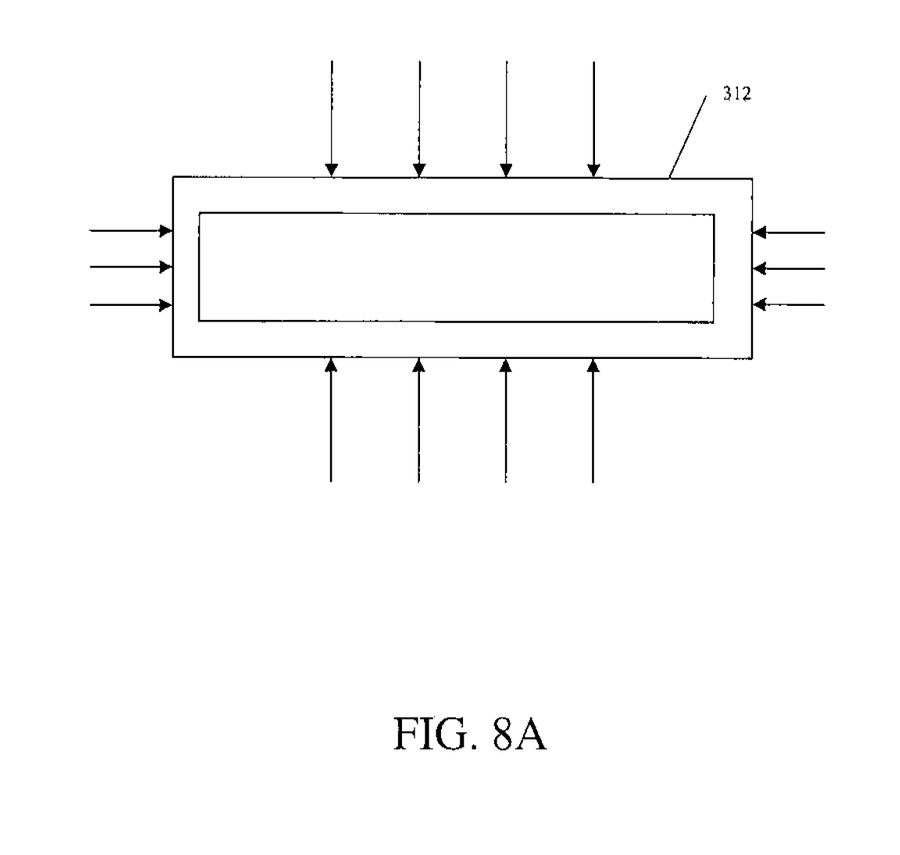
FIG. 8A shows a compliant insert in accordance with an embodiment of the present invention disposed within a cavity during a non-overpressure condition.
Figure 8B:
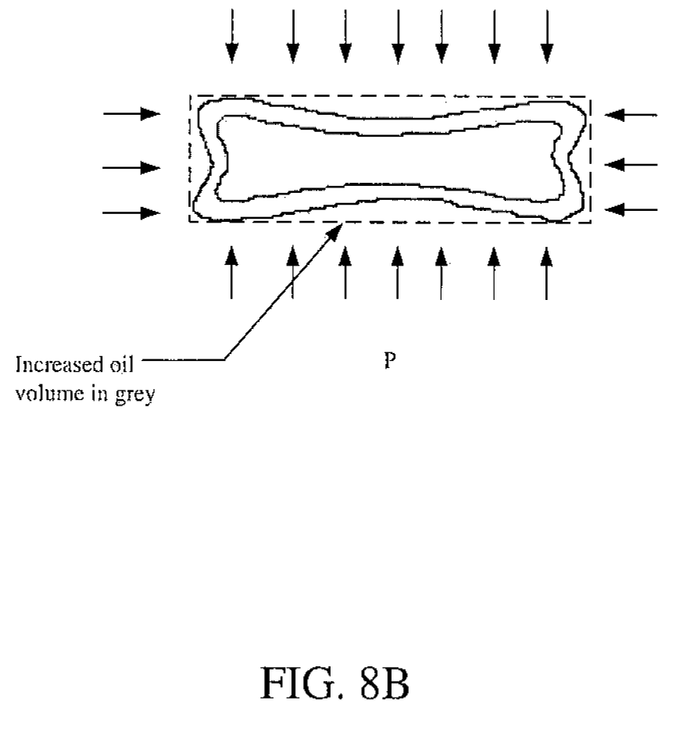
FIG. 8B shows a compliant insert in accordance with an embodiment of the present invention disposed within a cavity during an overpressure condition.
Figure 9A:
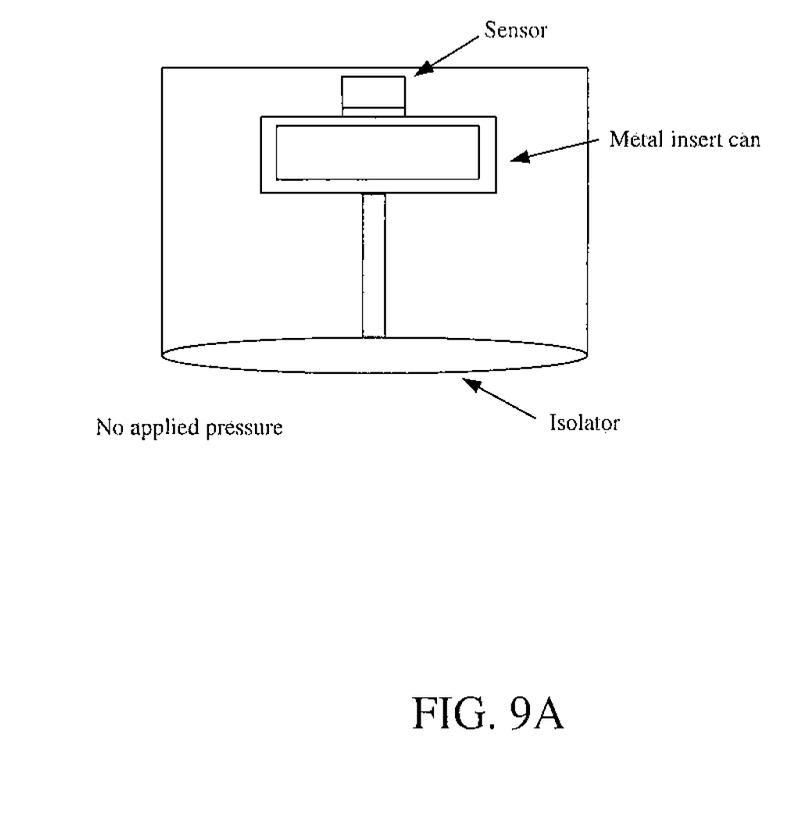
FIGS. 9A and 9B show, respectively, the operation of a compliant insert in accordance with an embodiment of the present invention during normal operating pressure and overpressure conditions.
Figure 9B:
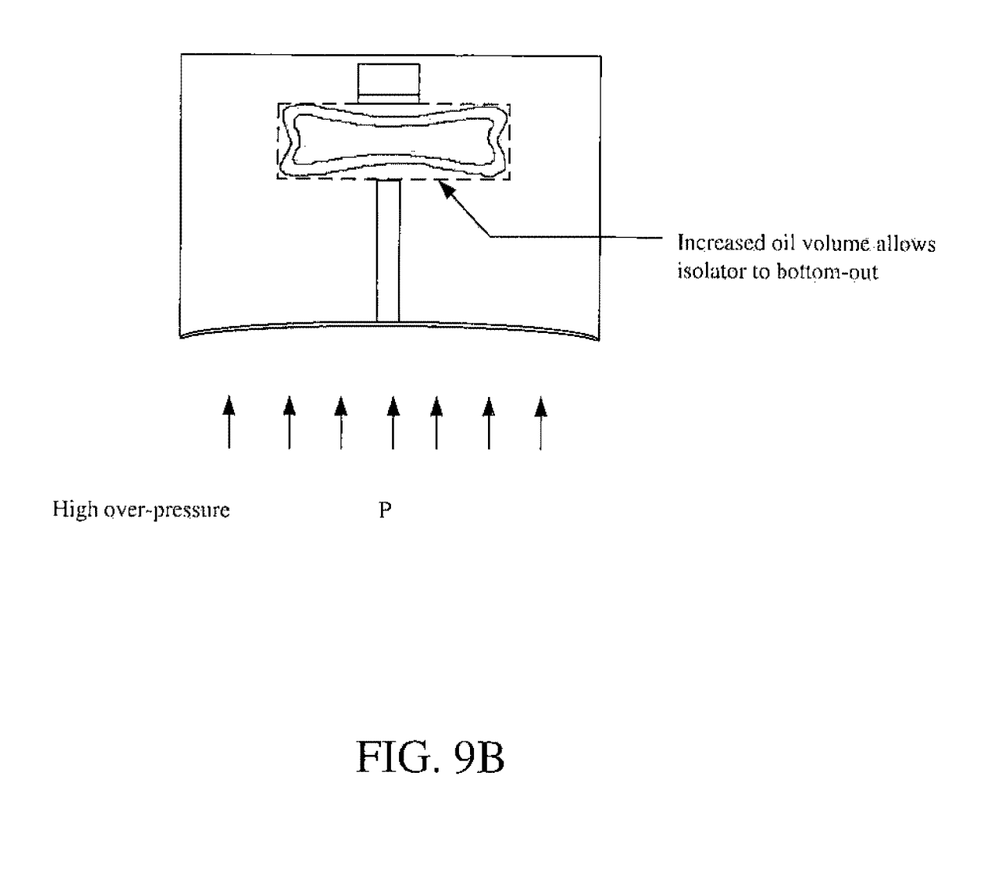

FIG. 8A illustrates compliant insert 312 in a non-overpressure condition. When pressure increases beyond the maximum operating pressure of the transmitter, compliant insert 312 undergoes sufficient deformation to increase the available volume for the fill fluid within cavity 310. FIG. 8B shows this condition. Further, FIGS. 9A and 9B show, respectively, the operation of the compliant insert during normal operating pressure where the isolator is not bottomed-out and during an overpressure event where compliant insert has deformed enough that the isolator has fully bottomed-out.

Embodiments of the present invention described herein generally provide increased overpressure resiliency for pressure transmitters. Such embodiments can be applied to pressure transmitters that provide absolute pressure measurements, gage measurements, differential pressure measurements, or any combination thereof. Additionally, while two distinct embodiments have been described, it is expressly contemplated that additional embodiments can be practiced by combining such distinct embodiments as well as utilizing other physical arrangements that provide compliance in response to overpressure events.

Although the present invention has been described with reference to preferred embodiments, workers skilled in the art will recognize that changes may be made in form and detail without departing from the spirit and scope of the invention.

What is claimed is:

1. A process fluid pressure transmitter comprising:
a pressure sensor having an electrical characteristic that changes in response to a deformation of the pressure sensor in response to pressure;
measurement circuitry coupled to the pressure sensor and configured to provide an indication of the electrical characteristic;
an isolation diaphragm configured to contact the process fluid and deform in response to process fluid pressure;
an incompressible fill fluid fluidically coupling the isolation diaphragm to the pressure sensor; and
an overpressure compliant structure coupled to the fill fluid and configured to be rigid at pressures below a selected threshold, but able to deform in response to pressure above the selected threshold.

2. The process fluid pressure transmitter of claim 1, wherein the overpressure compliant structure includes a rigid flexible diaphragm that is configured to be rigid at pressures below the selected threshold and deform in response to pressure above the selected threshold.

3. The process fluid pressure transmitter of claim 2, wherein the rigid flexible diaphragm has a first side contacting the incompressible fill fluid and a second side contacting a second fluid volume.

4. The process fluid pressure transmitter of claim 2, wherein the rigid flexible diaphragm is mounted between first and second pressure sensor module portions, and wherein a fill fluid passageway extends from the isolation diaphragm through the first and second pressure sensor module portions to a cavity to which the pressure sensor is coupled.

5. The process fluid pressure transmitter of claim 4, wherein a ceramic disc is disposed in the cavity.

6. The process fluid pressure transmitter of claim 4, wherein a second compliant structure is disposed within the cavity.

7. The process fluid pressure transmitter of claim 1, wherein the pressure sensor is formed of a silicon die.

8. The process fluid pressure transmitter of claim 7, wherein the pressure sensor is a strain gage pressure sensor.

9. The process fluid pressure transmitter of claim 7, wherein the pressure sensor is a capacitive pressure sensor.

10. The process fluid pressure transmitter of claim 1, wherein the selected threshold is about twenty percent higher than an upper measuring range of the process fluid pressure transmitter.

11. A process fluid pressure transmitter comprising:
a pressure sensor having an electrical characteristic that changes in response to a deformation of the pressure sensor in response to pressure;
measurement circuitry coupled to the pressure sensor and configured to provide an indication of the electrical characteristic;
an isolation diaphragm configured to contact the process fluid and deform in response to process fluid pressure;
an incompressible fill fluid fluidically coupling the isolation diaphragm to the pressure sensor;
a cavity disposed proximate and fluidically coupled to the pressure sensor; and
an overpressure compliant structure disposed in the cavity and configured to deform in response to overpressure to generate sufficient volume to allow the isolation diaphragm to bottom out.

12. The process fluid pressure transmitter of claim 11, wherein the overpressure compliant structure is shaped cylindrically.

13. The process fluid pressure transmitter of claim 12, wherein the overpressure compliant structure includes an oil channel extending from a first face of the cylinder to an opposite face of the cylinder.

14. The process fluid pressure transmitter of claim 11, wherein the overpressure compliant structure is formed of a hollow, metallic cylinder.

15. The process fluid pressure transmitter of claim 14, wherein the overpressure compliant structure is formed of as NiSpan-C Alloy 902.

16. The process fluid pressure transmitter of claim 11, wherein the overpressure compliant structure is formed of a polymer.

17. The process fluid pressure transmitter of claim 11, wherein the overpressure compliant structure is formed of foam ceramic.

18. The process fluid pressure transmitter of claim 11, wherein the selected threshold is about twenty percent higher than an upper measuring range of the process fluid pressure transmitter.

19. The process fluid pressure transmitter of claim 11, wherein the overpressure compliant structure is configured to return to its original shape and size after an overpressure condition passes.

* * * * *